United States Patent

[11] 3,626,396

[72] Inventors Dean E. Eastman
Putnam Valley, N.Y.;
George J. Fan, San Jose, Calif.

[21] Appl. No. 764,802
[22] Filed Oct. 3, 1968
[45] Patented Dec. 7, 1971
[73] Assignee International Business Machines Corporation
Armonk, N.Y.

[54] THIN-FILM MAGNETIC RECORDING HEAD
12 Claims, 8 Drawing Figs.

[52] U.S. Cl. .......... 340/174.1F, 346/74 MC, 179/100.2 CF
[51] Int. Cl. .......... G11b 5/16, G11b 5/20
[50] Field of Search .......... 346/74 MC; 179/100.2 CH, 100.2 CF; 340/174.1 F

[56] References Cited

UNITED STATES PATENTS

| | | | |
|---|---|---|---|
| 2,999,135 | 10/1961 | Wiegand | 179/100.2 CF |
| 3,182,300 | 5/1965 | Lemke | 179/100.2 X |
| 3,087,026 | 4/1963 | Daniels | 346/74 X |
| 3,441,884 | 4/1969 | Eppe | 346/74 X |
| 3,456,250 | 7/1969 | Barcaro et al. | 340/174.1 |

*Primary Examiner*—Terrell W. Fears
*Assistant Examiner*—Gary M. Hoffman
*Attorneys*—Hanifin and Jancin and George Baron ABSTRACT: A magnetic recording head is composed of a substantially U-shaped member made of very thin, highly permeable, ferrite pole pieces. The front gap of the head is of the order of 0.1 mil in width and the magnetic path of the head is closed at the back sides of the pole pieces with a magnetic permalloy film having square loop or nonlinear switching characteristics. The use of the square loop film together with high-permeability pole pieces permits a small magnetic field from a tape or disc to switch a large amount of flux in the permalloy film. Such flux reversal can be sensed with a single turn film of metal.

INVENTORS
DEAN E. EASTMAN
GEORGE J. FAN

BY George Baron
ATTORNEY

THIN-FILM MAGNETIC RECORDING HEAD

BACKGROUND OF THE INVENTION

Data can be stored magnetically in cores, on discs and on tapes. A constant concern of manufacturers of memories is the cost of bulk memory in terms of cost per bit. Assuming a core memory costs approximately a one-tenth of a cent a bit, a bulk core memory having $10^9$ bits would cost about $10^6$ dollars, or a million dollars a memory. Costs per bit are lower for discs, and considerably lower for tapes. As the data-processing art continues to develop, there is a daily demand to lower this cost-per-bit ratio.

One direction taken by workers in the data storage field is to increase the density of storage of magnetic information. As such density increases, the magnetic spot that contains the binary information will be smaller and thus contain a very small amount of magnetism. As a consequence, the recording head must be capable of sensing such magnetism and produce a significant signal capable of discriminating between the storage of a "1" or a "0."

Most prior art devices employ electromagnetic transducers for reading the stored magnetic information. Such transducers comprise a closed loop of low reluctance, highly permeable material having a very narrow air or nonmagnetic gap in the loop. When there is relative motion between the gap and the stored magnetic flux, magnetic flux is induced in the closed path. A wire inserted in the closed path is cut by the induced flux and generates a voltage pulse to a suitable sensing mechanism. Where the stored magnetism is weak, the induced voltage is undesirably low.

To overcome this inherent difficulty, namely, a weak output voltage signal because of a weak stored magnetic field in the tape, a transducer has been proposed which consists of a closed path of a soft magnetic nonlinear material save for a nonmagnetic gap. When the gap moves relative to the stored flux, the magnetic field induced in the closed path switches the soft magnetic material from one magnetic remanent state to a second magnetic remanent state. A wire or film associated with the switching nonlinear magnetic has a voltage pulse induced therein, which pulse is sensed by a suitable voltage level sensing device. An example of such a recording head is given in an article entitled "Readback Head for High Density Recording" by J. F. Morrison et al. that appeared on page 124 of the July 2, 1966, Vol. 9 issue of the "IBM Technical Disclosure Bulletin." Such type recording head was found to be difficult to switch field the low magnetic filed in the tape or other record member has to switch the entire head, and the volume of most heads would be too high to be able to be made to switch by the low magnetic flux stored in high-density magnetic tapes.

The present invention offsets the difficulties in the prior art by employing two high permeability, low-reluctance legs as part of the recording head. The top portions of the two are separated by a very small nonmagnetic gap. The bottom portions of the two legs are connnected by a thin film of permalloy or similar magnetic material having a substantially square B-H nonlinear hysteresis loop. When the gap passes over the stored magnetic bit, the pole pieces serve to concentrate the induced flux from the tape and concentrate it across the thin film, causing the latter to switch, producing a relatively high voltage output in a wire associated with the film.

It is an object of this invention to provide a recording head that is particularly applicable to the sensing of very weak magnetic signals.

It is yet another object to provide a recording head that is applicable to the recording of magnetically stored binary data.

Still another object is to provide magnetic transducers capable of being manufactured by thin-film deposition techniques, making them compatible with high-density, low-weight memory devices.

The foregoing and other objects, features and advantages of the invention will be apparent from the following more particular description of preferred embodiments of the invention, as illustrated in the accompanying drawings.

SUMMARY OF THE INVENTION

Figure 1:
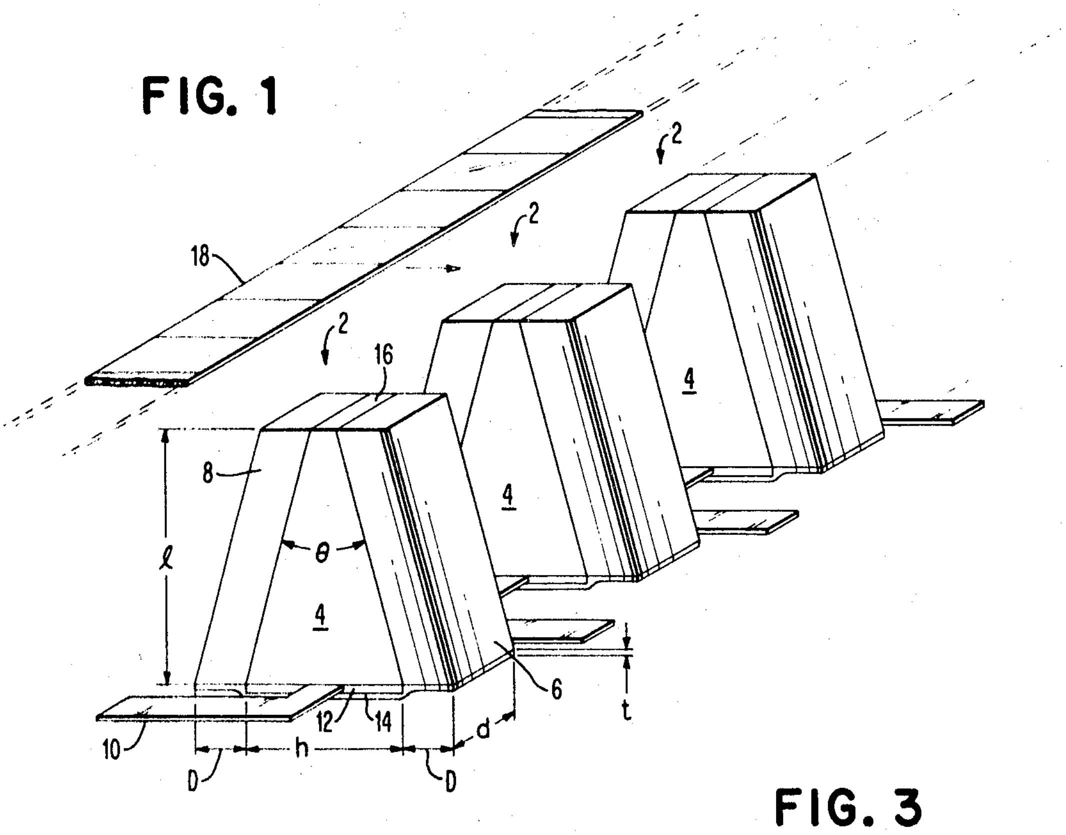
FIG. 1 is a schematic representation of an array of novel recording heads.
Figure 3:
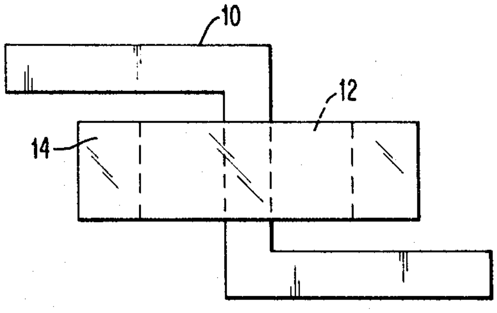
FIG. 3 is a bottom view of the recording head showing the relationship of the sense film to the switchable magnetic film of the recording head.

In FIG. 1, there is shown an array of recording heads 2, wherein the array may comprise as many as a hundred or more heads but only three of which are shown, each head 2 comprising a copper wedge 4 onto which are deposited two low-reluctance, highly permeable legs 6 and 8. An example of such leg is a copper zinc ferrite having bismuth therein. By mixing the latter composition with nickel-zinc ferrites, one obtains a family of materials possessing medium to high permeability as well as a high-to-low frequency response. Also deposited to the base of copper wedge 4 is a thin strip of copper 10 or other electrically conducting material, the latter serving to have a voltage induced therein when a changing magnetic field occurs in the area of such film 10.

Figure 2:
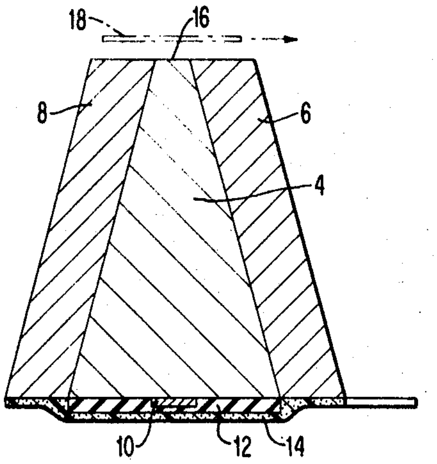
FIG. 2 is an enlarged view of the novel recording head.

The bottom portions of legs or pole pieces 6 and 8 may contain an insulated spacer 12 (better seen in FIG. 2) over which is deposited a magnetic layer 14, such layer being of a low coercive force switching material, a nickel-iron composition, permalloy, or the like. The insulated spacer is optional and is used only if the method of manufacturing the head requires it. The pole pieces 6 and 8 and copper wedge 4 are ground and polished to produce a nonmagnetic gap 16. When the recording heads are completed, each head in the array will have the following dimensions that are representative of a well-functioning head suitable for batch fabrication manufacturing techniques. The head gap 16 between pole pieces 6 and 8 is of the order of 0.1 mil in width and the pole pieces diverge at an angle $\theta$=7°. The magnetic path of the head 2 is closed at the back side of the pole pieces with the magnetic permalloy film 14 by a length $L=h+2D$ wherein $h=\theta\times l$. D is the thickness of each pole piece 6 and 8 and $l$ is its length. Assuming $l$=20 mils and D is 10 mils, $h$ is 2 mils, then the total film length L is 22 mils. However, the effective magnetic path length of the switchable film is only about $h$ or 2 mils.

The function of film 10 is to provide single-turn sensing of a recording member, such as tape 18. Since film 14 has a high magnetization (of the order of 10,000 oersteds) and a low coercive force $H_c$ of about 0.5 oersteds or less, a small magnetic field from a magnetic storage bit on tape 18 will switch a large amount of flux in the film 14, which flux reversal is sensed by the single-turn film strip 10.

Although the head 2 is shown as having a supporting structure that is triangularly shaped, it is to be understood that such supporting structure can be rectangular, spherical, or any other shape so long as a low-coercive material of high-magnetic permeability is located in the closed path of the low-reluctance pole pieces.

Figure 4:
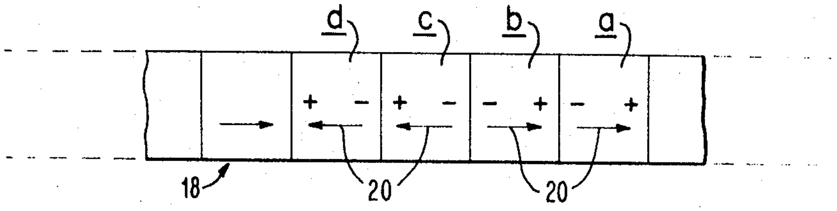
FIG. 4 is a schematic showing of a conventional tape magnetically storing binary bits.
Figure 5:
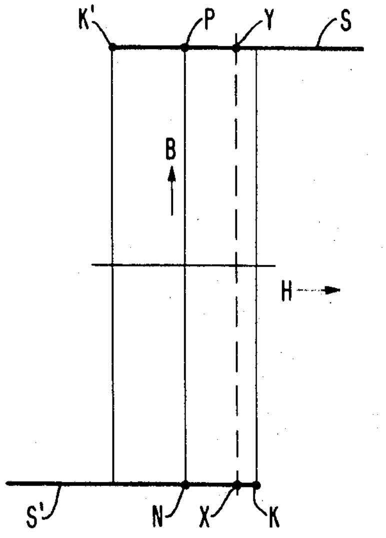
FIG. 5 is a B-H loop for the switchable magnetic film of the recording head.
Figure 6:
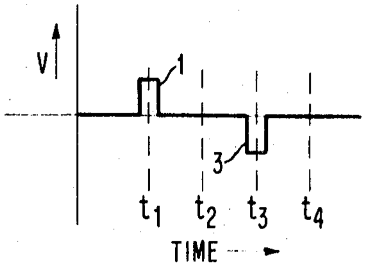
FIGS. 6 and 7 are plots of voltages appearing on a sense line as a function of time when binary information is read from a magnetic tape.

FIG. 5 is the B-H characteristics of magnetic film 14, FIG. 4 is an example of magnetic binary storage in a record medium such as tape, and FIG. 6 is a voltage-time plot of the output pulse appearing on strip 10 when magnetic film 14 switches. It is assumed that arrows 20 represent the manner in which a bit of information is magnetically stored and a 1 is represented by an arrowhead pointing to the right (indicative of the storage of a positive magnetic pole) and a 0 is represented by an arrowhead pointing to the left (indicative of the storage of a negative magnetic pole). The permalloy film 14 is initially set to be at its negative remanent state N at the time that interrogation of tape 18 commences. The magnetic energy stored in bit *a* is positive, so such bit *a* drives film 14 beyond the knee K of the B-H loop into positive saturation region S, producing at time $t_1$ the voltage output pulse 1, shown in FIG. 6, in strip 10. After such switching, film 14 relaxes to its positive remanent state P.

At time $t_2$, binary spot *b* is sampled by head 2 and since *b* is oriented in a positive direction, film 14 is driven in the direction of positive saturation S, producing no switching of film 14. Thus there is no voltage induced in strip line 10 and no voltage pulse appears at time $t_2$, indicating that the bit *b* contains the same binary information as bit *a*. At time $t_3$, binary bit *c* is sensed by head 2 and the stored magnetic energy drives film 14 in the negative direction past the knee K' of the B-H loop into the region of negative saturation S'. As a consequence, film 14 switches, inducing a negative voltage 3 in strip line 10. At time interval $t_4$ there is no voltage output produced in strip 10 in that binary bit *d* is the same as binary bit *c*.

Figure 7:
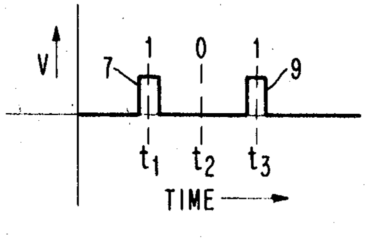
Figure 8:
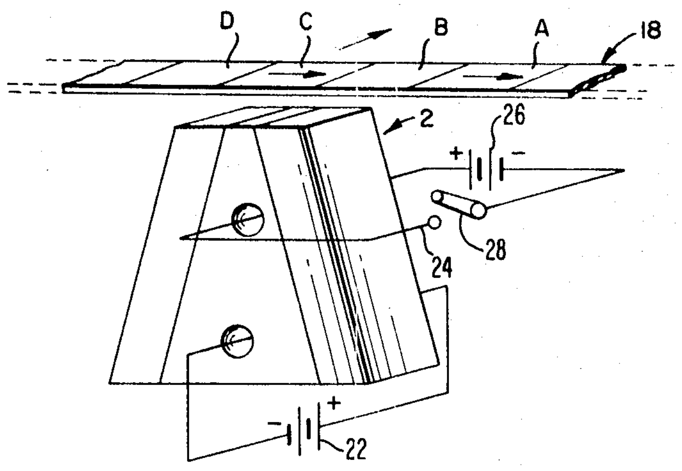
FIG. 8 is a schematic showing of a recording head useful for writing as well as for reading binary information.

FIGS. 5, 7 and 8 are employed to illustrate how the invention can be used when binary storage consists of positive magnetism for a binary 1 as represented by arrows at locations A and C on tape 18 in FIG. 8 or by no magnetism (for the storage of a 0) as indicated by the absence of stored magnetism at locations B and D. The stored tape 18 is made to move relative to recording head 2. The recording head 2 is biased by battery 22 at point X of the B-H loop near the heel K' of the loop. When the gap of the recording head 2 traverses the binary 1 stored at location A of tape 18, film 14 is switched into saturated state S, producing the output voltage pulse 7 in line 10 at time $t_1$. After the readout of location A, the film 14 would normally relax to position Y on the B-H loop of FIG. 5. However, during each read cycle for each read head 2, a negative pulse is applied to the head immediately after the read or interrogating pulse is applied so that film 14 is reset to its bias condition indicated by position X of the B-H loop of FIG. 5. At time $t_2$, there is no magnetic storage at location B, so no voltage is induced in head 2. FIG. 7 indicates the presence of binary 0 at location B by the absence of a voltage pulse in strip 10. When location C is sensed at time $t_3$, the presence of binary 1 bit produces an output voltage pulse 9. The bias provided by battery 22 is not essential for the operation of the device However, such bias allows a smaller amount of flux from tape 18 to switch film 14.

If desired, the recording head can be used only for the reading of information. However, by employing a winding 24 inserted in copper block 4, battery 26 and switch 28, sufficient current can be made to flow through winding 24 by the closing of switch 28 to store positive magnetism (i.e., binary 1's) in tape 18. After writing, a small pulse can be applied to winding 10 to prepare low-coercive force film 14 for reading, without affecting tape 18, which has a large coercive force.

The legs 6 and 8, strip line 10, and magnetic film 14 are made by any of the conventional ways for making very thin layers. Vapor deposition techniques, printed circuit techniques, silk screen processes, etc. can be relied upon to make the recording heads. The head, by employing two low-reluctance highly permeable legs, directs the magnetic flux from a recording surface onto a switchable thin magnetic film. For a permalloy film 14 that is 5,000 A. thick and about 75 sq. mils in area, a stored magnetic flux bit of approximately 250 gauss in tape 18 will switch the film. Such switching will result in a voltage of approximately 0.6 m$v$ for a pulse width of 1 $\mu$sec. produced in strip line 10. The copper block 4, besides being a mechanical spacer for legs 6 and 8, blocks high-frequency flux leakage across the gap of the head.

The novel head shown and described herein is particularly applicable for use as a miniaturized and inexpensive recording head having very rapid switching characteristics, a large signal/noise ratio, and lends itself toward being produced by batch fabrication techniques. Such heads can be produced in an array of a thousand or more heads in a given unit and the entire array can be embedded in an epoxy material, so as to fix the position of one head with respect to another head in the array.

While the invention has been particularly shown and described with reference to preferred embodiments thereof, it will be understood by those skilled in the art that various changes in form and details may be made therein without departing from the spirit and scope of the invention.

What is claimed is:

1. A magnetic recording head comprising:
   a nonmagnetic member,
   a magnetic circuit disposed on the surface of said member including low-reluctance high-magnetic permeability elements spaced apart by said member forming nonmagnetic gaps therebetween,
   a magnetic element in the form of a thin film having thin-film properties and square-loop B-H characteristics interconnecting said low-reluctance, high-magnetic permeability elements across one of said gaps, and
   means disposed in juxtaposition with said nonmagnetic member into which at least one conductor is receivable.

2. The recording head of claim 1 wherein said nonmagnetic material is copper.

3. The recording head of claim 1 wherein said magnetic element having square-loop B-H characteristics is permalloy.

4. A magnetic recording head according to claim 1 wherein said means disposed in juxtaposition with said nonmagnetic member is at least an aperture into which a sense conductor is receivable.

5. A magnetic recording head according to claim 1 wherein said means disposed in juxtaposition with said nonmagnetic member is an aperture into which a conductor for causing variations in said magnetic circuit is receivable.

6. A magnetic recording head comprising a triangular-shaped nonmagnetic electrically conductive material,
   a thin film of low-reluctance high-magnetic permeability material disposed on two legs of said triangle such that said conductive material forms a nonmagnetic gap between said films,
   a nonmagnetic electrically conductive strip deposited on a portion of the third leg of said triangle and disposed substantially at right angles to said third leg, and
   a magnetic element in the form of a thin film having thin-film properties and a square-loop B-H characteristic deposited along said third leg and insulated therefrom, said last named film connecting said low-reluctance high-magnetic permeability films to form a continuous magnetic path save for said gap.

7. A magnetic recording head comprising a substantially closed magnetic loop of low-reluctance high-permeability material,
   a nonmagnetic gap in said closed loop adapted to be located adjacent a magnetically stored record member,
   a magnetic material in the form of a thin film having thin-film properties and square-loop B-H characteristics inserted within a portion of said closed magnetic loop, and
   means disposed in electromagnetically coupled relationship with said loop for sensing and causing variations in magnetic field in said loop.

8. The magnetic recording head of claim 7 wherein said square-loop magnetic material has a coercive force of the order of 0.5 oersteds or less.

9. A magnetic recording head comprising a substantially triangular-shaped nonmagnetic electrically conductive material wherein one angle of said triangle is approximately 7°,
   a thin film of low-reluctance high-permeability material disposed on the two legs forming said 7° angle, said films and nonmagnetic material forming nonmagnetic gaps between said legs,
   a magnetic film having thin-film properties and square-loop B-H characteristics on said third leg, said last named film connecting said films across one of said gaps to form a continuous magnetic path save for the other of said gaps, and means disposed in electromagnetically coupled relationship with said low-reluctance high-permeability films and said film having square-loop B-H characteristics for sensing and causing variations in magnetic field in said films.

10. The recording head of claim 9 wherein said triangular shaped nonmagnetic electrically conducting material is copper.

11. The recording head of claim 9 wherein said means disposed in electromagnetically coupled relationship with said films includes a single electrically conductive strip deposited on said nonmagnetic electrically conductive material, said strip being substantially at right angles to said magnetic film having B-H characteristics.

12. The recording head of claim 11 including means for magnetically biasing said magnetic film during its quiescent state.

* * * * *